United States Patent [19]

Ishima

[11] Patent Number: 4,989,100
[45] Date of Patent: Jan. 29, 1991

[54] IMAGE READER FOR AN IMAGE RECORDING APPARATUS

[75] Inventor: Kazumi Ishima, Kashiwa, Japan

[73] Assignee: Ricoh Company, Ltd., Tokyo, Japan

[21] Appl. No.: 369,817

[22] Filed: Jun. 22, 1989

[30] Foreign Application Priority Data

Jun. 22, 1988 [JP] Japan .................................. 63-154248
Jan. 9, 1989 [JP] Japan ...................................... 1-2327

[51] Int. Cl.$^5$ .......................... H04N 1/10; H04N 1/04
[52] U.S. Cl. ..................................... 358/483; 358/482; 358/475; 358/446; 358/461
[58] Field of Search ............... 358/446, 471, 474, 475, 358/482, 483, 493, 494, 211, 213.16, 213.11, 461, 463, 462, 75, 448, 400, 497, 486, 401, 408, 479, 481, 487; 355/228, 229, 231, 233, 234, 235

[56] References Cited

U.S. PATENT DOCUMENTS 4,922,335  5/1990  Outa et al. ........................... 358/461

FOREIGN PATENT DOCUMENTS 0145413  12/1978  Japan .
0085673  5/1985   Japan .
0078963  4/1987   Japan .
0219758  9/1987   Japan .
0314967  12/1988  Japan .

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

An image reader for an image forming apparatus has an array of CCD sensors in the form of chips which are arranged in a zigzag configuration along an image reading line. A reference white plate is located in association with the position of and outside of the effective image reading range of one of two CCD sensors which are situated at opposite ends of the array. The CCD sensor with which the reference white plate is associated produces a reference white signal by reading the reference white plate. The output gain of this CCD sensor is controlled on the basis of the reference white signal. The reference white signal is added to output signals of the other CCD sensors in the form of a pilot signal, whereby the output gains of the other CCD sensors are controlled.

9 Claims, 5 Drawing Sheets

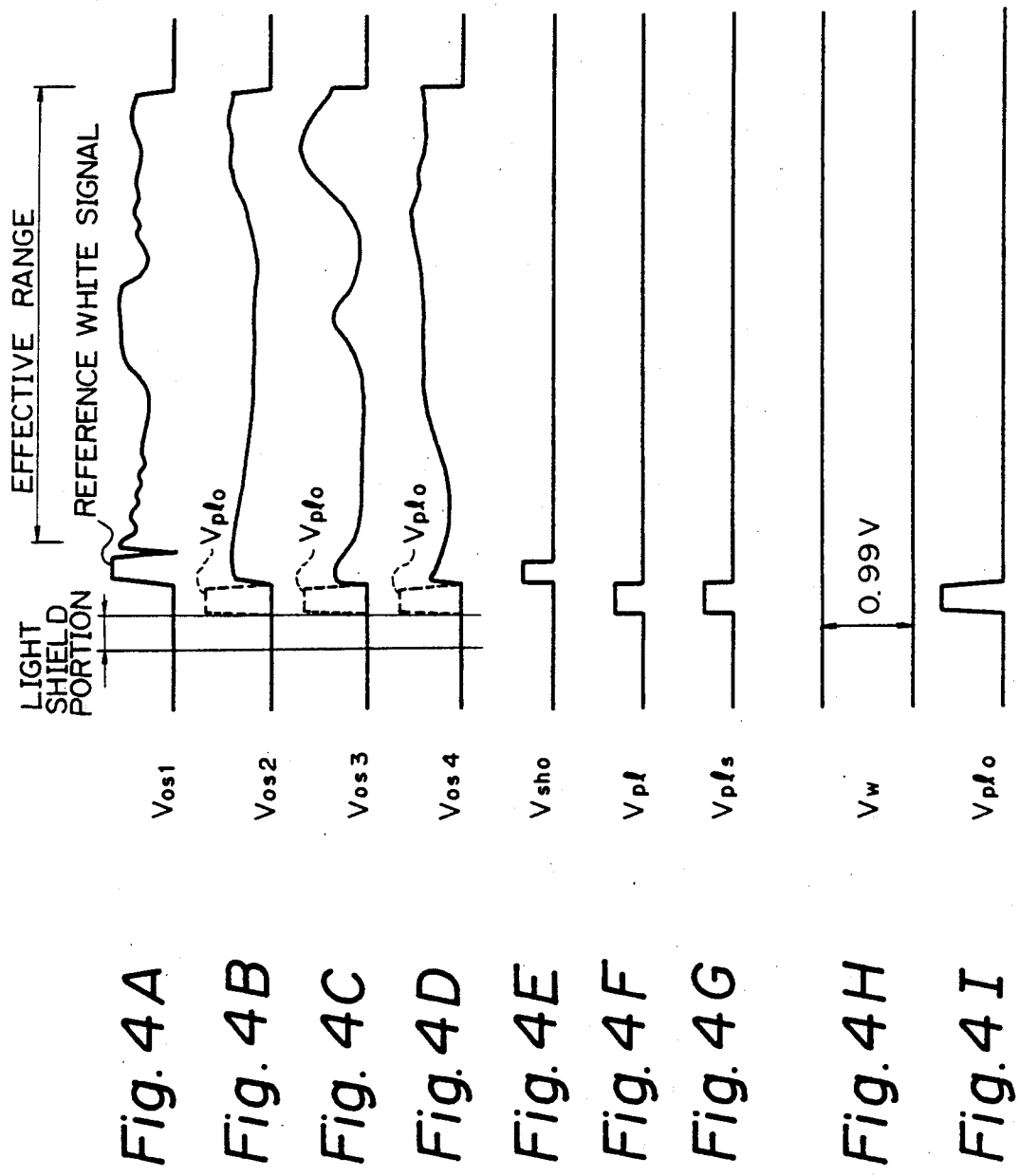

IMAGE READER FOR AN IMAGE RECORDING APPARATUS

BACKGROUND OF THE INVENTION

The present invention relates to an image reader for use in an image recording apparatus.

An electrophotographic copier, facsimile machine, laser printer or similar image recording apparatus has an image reader for reading an original image to be recorded. A predominant type of image reader is implemented as a one-dimensional line sensor in the form of a CCD array. A problem with this kind of image reader is that the output of the line sensor associated with an original image is often effected by various occurrences such as a change in the quantity of light issuing from a light source which illuminates the image. In light of this, it has been customary to locate a reference white plate in association with a portion of the line sensor outside of an effective pixel reading range and to control the gain of the output voltage of the line sensor by a white signal which is derived from the reference white plate. Another type of image sensor heretofore proposed is a fragmentary image sensor which is usable with a 1:1 magnification optics type image reader. Elaborated to increase the effective pixel reading length, the fragmentary image sensor has a plurality of CCD chips which are arranged in a zigzag array. This kind of image sensor also needs the above-stated gain control and, in this respect, has a problem unsolved. Specifically, assume a fragmentary image sensor made up of four independent CCD sensor chips by way of example. Then, while two of the four CCD chips located at opposite ends of the array can have their gain controlled by locating two reference white plates at the opposite ends of the array, the gain control is not practicable with the other two CCD chips intervening between the end chips because reference white plates would interfere with the read-out of an original image in the effective pixel reading range. Hence, should the quantity of light issuing from the light source change, the output voltages of the intermediate chips would change resulting in the quality of a recording being degraded.

SUMMARY OF THE INVENTION

It is therefore an object of the present invention to provide an image reader for use in an image recording apparatus which prevents the quality of a recording from being degraded.

It is another object of the present invention to provide an image reader for an image recording apparatus which controls the gains of the outputs of individual sensor fragments with accuracy.

It is another object of the present invention to provide a generally improved image reader for an image recording apparatus.

An image reader for an image forming apparatus of the present invention comprises a fragmentary image sensor comprising a plurality of sensors which are arranged in an array along an image reading line, a reference white plate located in association with a particular position of and outside of an effective pixel reading range of one of two of the sensors which are situated at opposite ends of the image reading line, the one sensor producing a reference white signal by reading the reference white plate, and control circuitry for controlling an output gain of the one sensor in dependence on the reference white signal.

BRIEF DESCRIPTION OF THE DRAWINGS

The above and other objects, features and advantages of the present invention will become more apparent from the following detailed description taken with the accompanying drawings in which:

FIGS. 4A to 4I are timing charts useful for understanding the operation of the image reader in accordance with the present invention.

DESCRIPTION OF THE PREFERRED EMBODIMENT

Figure 1:
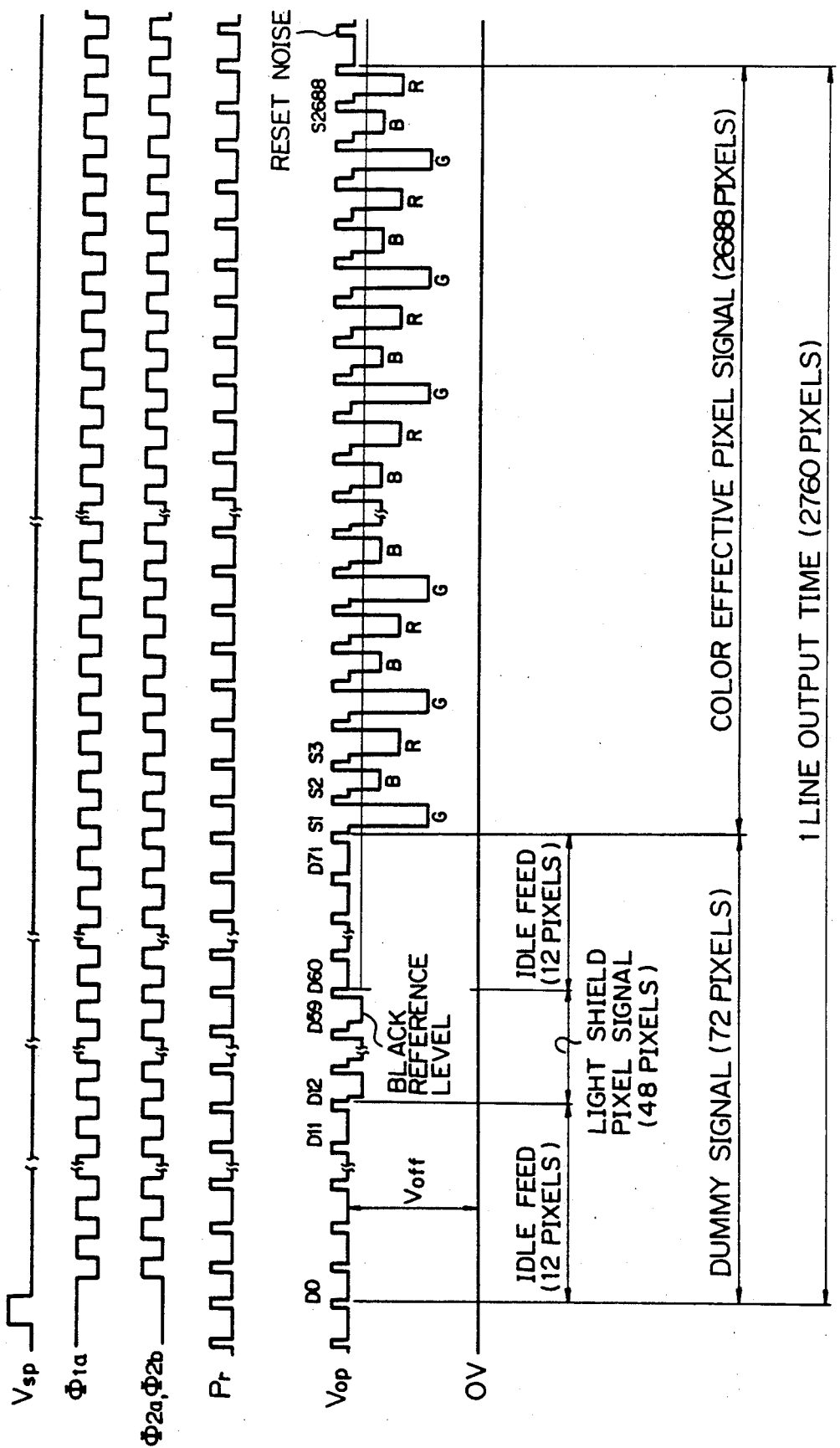
FIG. 1 is a timing chart showing a common CCD output signal.

Referring to FIG. 1 of the drawings, a one-dimensional line sensor implemented as a CCD array and constituting an image sensor of an image reader embodying the present invention produces an image signal $V_{op}$. As shown, the image signal $V_{op}$ is generated while being controlled as to the timing by shift pulses $V_{sp}$, carrier pulses $\Phi_{1a}$, $\Phi_{2a}$ and $\Phi_{2b}$, and reset pulses $P_r$. Usually, the image signal $V_{op}$ is an analog voltage having an offset voltage $V_{off}$ and which is outputted together with a signal generally called reset noise. The image signal $V_{op}$ is headed by a dummy signal representative of seventy-two pixels, i.e., twelve pixels D0 to D11 for idle feed, forty-eight pixels D12 to D59 for light shield, and twelve pixels fD60 to D71 for idle feed. The dummy signal is followed by a color effective pixel signal representative of 2,688 pixels which are associated with green (G), blue (B) and red (R). Hence, a one line outputting time is associated with 2,760 pixels in total.

Figure 2:
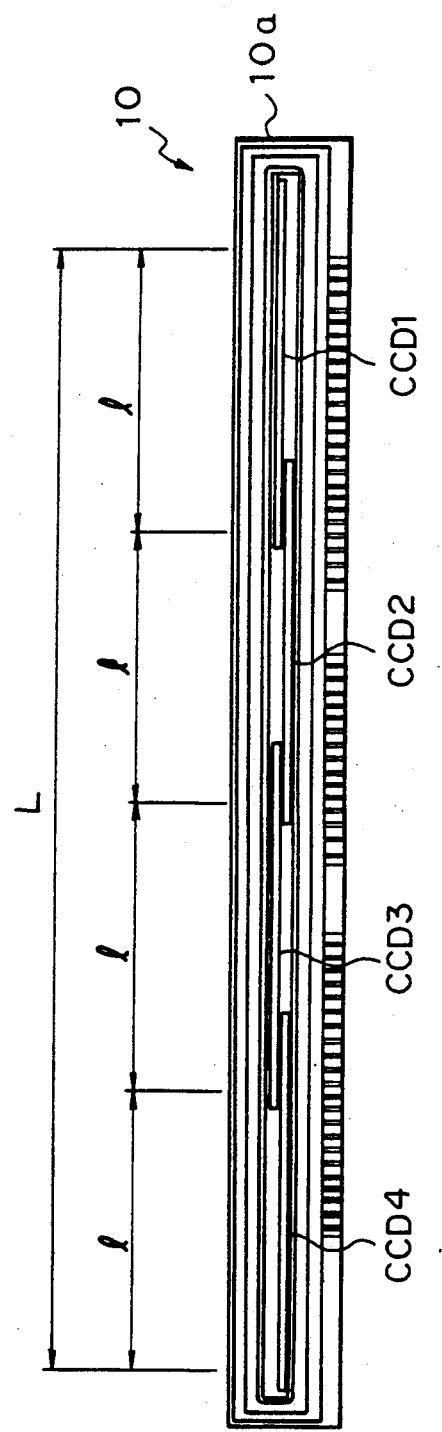
FIG. 2 is a plan view of a CCD array.

As shown in FIG. 2, in the illustrative embodiment, a fragmentary CCD array 10 for reading pixels has a framework 10a and a plurality of CCD chips, e.g. four CCD chips CCD1 to CCD4 as illustrated. The CCD chips CCD1 to CCD4 are arranged in a zigzag configuration along a pixel reading line of the framework 10a while overlapping each other. The CCD chips CCD1 to CCD4 have the same effective reading length l, the sum of the lengths l defining an effective reading length L (=4l). The CCD chips CCD1 to CCD4 produce outputs at the same time.

Figure 3A:
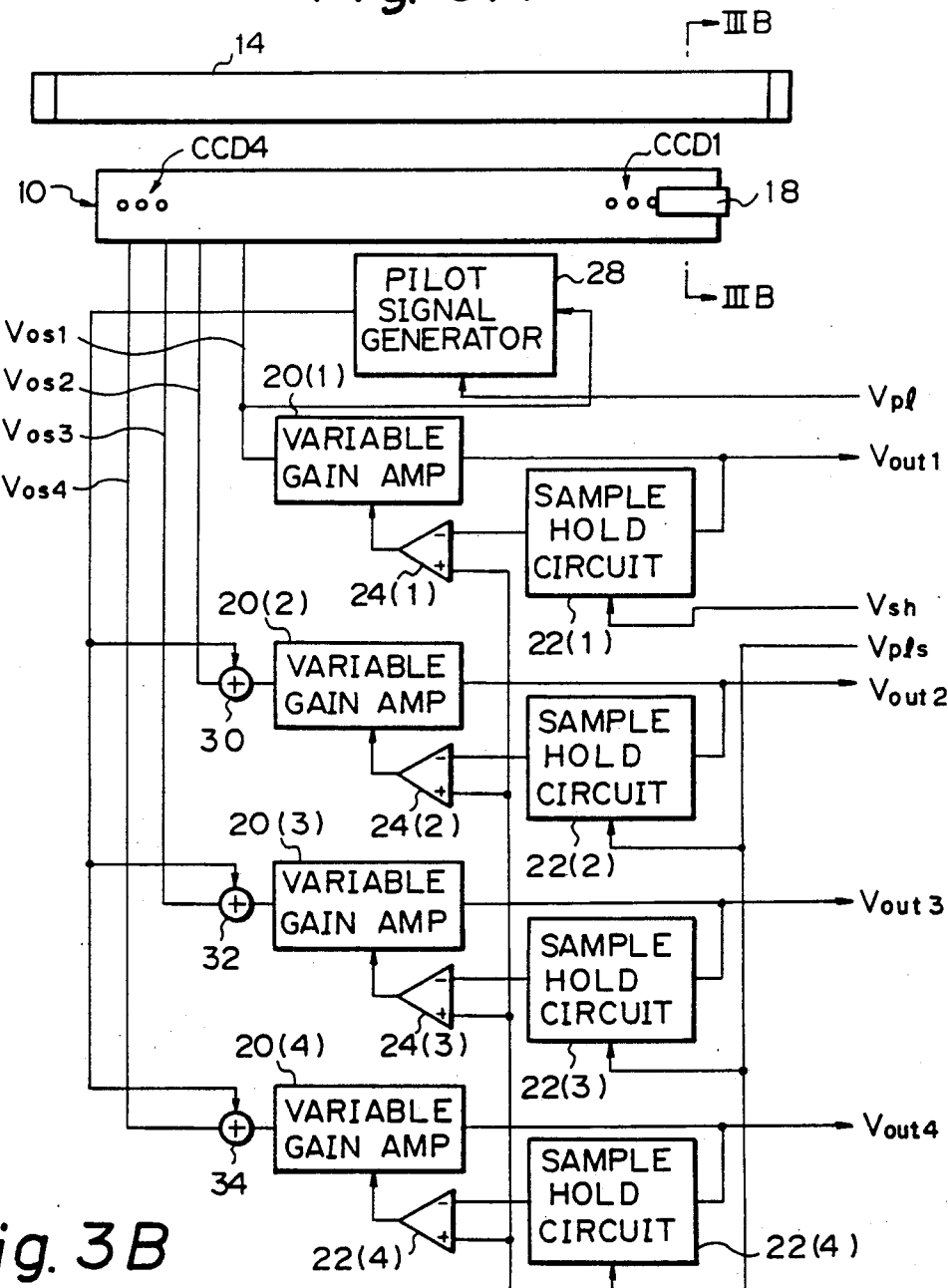
FIG. 3A is a schematic block diagram representative of an image reader embodying the present invention.
Figure 3B:
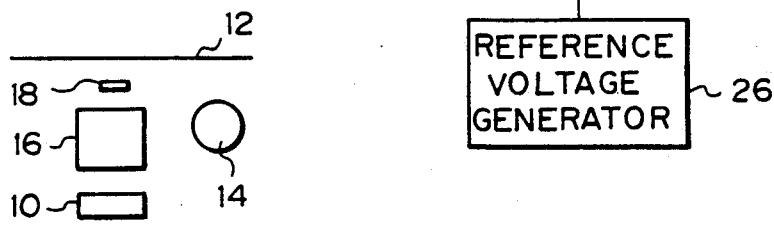
FIG. 3B is a section along line IIIB—IIIB of FIG. 3A.

Referring to FIGS. 3A and 3B, there is shown the construction of the image reader including the CCD array 10. As shown, while a fluorescent lamp 14 illuminates an original document 12, a reflection from the document 12 is incident to the CCD array 10 through a lens array 16. In the illustrative embodiment, a reference white plate 18 is associated with, of the two CCD chips CCD1 and CCD4 which are located at opposite ends of the array, the CCD chip CCD1. Specifically, the reference white plate 18 is located in association with one end portion of the CCD chip CCD1 which is outside of the effective image region of the latter, i.e., a non-image signal region, so that it may be illuminated by the lamp 14 in place of the document 12. Hence, while the lamp 14 is turned on, the part of the CCD chip CCD1 which is associated with the reference white plate 18 continuously produces a reference white signal.

As shown in FIG. 3A, the output $V_{os1}$ of the CCD chip CCD1 is applied to a variable-gain amplifier 20 (1) which then outputs a voltage $V_{out1}$. The output $V_{out1}$ of the amplifier 20 (1) is fed back to the amplifier 20 (1) via a sample and hold circuit 22 (1) and an error amplifier 24 (1). The sample and hold circuit 22 (1) is caused to hold the instantaneous voltage by a sample and hold signal $V_{sh}$. This allows the amplification factor of the amplifier 20 (1) to be varied in dependence on the output voltage $V_{err}$ of the error amplifier 24 (1). Specifically, the amplification factor increases and decreases with the voltage $V_{err}$. The error amplifier 24 (1) amplifies a difference between the output $V_{sh0}$ of the sample and hold circuit 22 (1) and the reference voltage $V_{ref}$ which is generated by a reference voltage generator 26.

Variable-gain amplifiers 20 (2), 20 (3) and 20 (4) are associated with the other CCD chips CCD2, CCD3 and CCD4, respectively. The gains of the amplifiers 20 (2), 20 (3) and 20 (4) are variable in association with the outputs of error amplifiers 24 (2), 24 (3) and 24 (4), respectively. While the CCD chips CCD2 to CCD4 individually produce outputs $V_{so2}$ to $V_{so4}$, the amplifiers 20 (2) to 20 (4) individually produce outputs $V_{out2}$ to $V_{out4}$. Sample and hold circuits 22 (2), 22 (3) and 22 (4) are associated with the error amplifiers 24 (2), 24 (3) and 24 (4), respectively.

In the illustrative embodiment, a pilot signal generator 28 generates a pilot signal $V_{pi0}$ in response to a pilot generate signal $V_{pl}$ and based on the output $V_{os1}$ of the CCD chip CCD1. The pilot signal $V_{pi0}$ is added to the individual outputs $V_{os2}$, $V_{os3}$ and $V_{os4}$ by adders 30, 32 and 34, respectively, at the input side of the variable-gain amplifiers 20 (2) to 20 (4).

The operation of the image reader having the above construction will be described with reference to FIGS. 4A to 4I. The output $V_{os1}$ of the CCD chip CCD1 constantly involves a reference white voltage which is associated with the reference white plate 18. The sample and hold circuit 22 (1) holds the reference white voltage in response to the sample and hold signal $V_{sh}$ to thereby produce a reference white signal $V_w$ (FIG. 4H). The reference white signal $V_w$ is a signal held by the sample and hold signal $V_{sh}$ and is outputted as one form of the sample and hold signal $V_{sh0}$ (FIG. 4E). The pilot signal generator 28 generates the pilot signal $V_{pi0}$ (FIG. 4I) in response to the pilot generate signal $V_{pl}$ (FIG. 4F) and prior to the appearance of the reference white signal $V_w$ which forms a part of the output $V_{os1}$. The pilot signal $V_{pi0}$ is added to the outputs $V_{os2}$, $V_{os3}$ and $V_{os4}$ (FIGS. 4B to 4D) of the CCD chips CCD2, CCD3 and CCD4 by the adders 30, 32 and 34, as stated earlier. The added pilot signal $V_{pi0}$ is indicated by phantom lines in FIGS. 4B to 4D. Since the light shield portion is used for a black reference, the pilot signal $V_{pi0}$ may be added to the outputs $V_{os2}$ to $V_{os4}$ at any desired timing at which the image signal is absent. The added pilot signal $V_{pi0}$ is sampled and held by the individual sample and hold circuits 22 (2) to 22 (4). It is to be noted that, although the added pilot signal $V_{pi0}$ occurs at the same timing as the pilot generate signal $V_{pl}$ and is directly implemented by the latter in practice, the former is shown as being independent of the latter for facilitating an understanding of the operation. The voltages held by the sample and hold circuits 22 (2) to 22 (4) are compared with the reference voltage $V_{ref}$ by the associated error amplifiers 24 (2) to 24 (4). The outputs of the error amplifiers 24 (2) to 24 (4) are then individually fed to the variable-gain amplifiers 20 (2) to 20 (4), thereby controlling the gains of the amplifiers 20 (2) to 20 (4) adequately.

As stated above, when the output of the CCD chip CCD1 is varied due to a change in the quantity of light issuing from the lamp 14, a change in the circuit conditions or aging, for example, the variation is cancelled by the gain control associated with the reference white signal which is derived from the reference white plate 18. As regards the other CCD chips CCD2 to CCD4 which lack the reference white plate 18, the pilot signal $V_{pi0}$ associated with the reference white signal is added to their outputs so as to implement the gain control in the same manner as with the CCD chip CCD1. This eliminates a difference in level between the chips CCD1 to CCD4 and thereby a density difference between the CCD chip outputs.

Assume a standard condition wherein the reference voltage $V_{ref}$ is 1 volt and the reference white signal $V_w$ is 0.99 volt, for example. Then, the error output voltage $V_{err}$ of the error amplifier 24 (1) is produced by:

$$V_{err} = A \cdot (V_{ref} - V_w)$$

where A is the amplification factor of the error amplifier 24 (1).

Figure 5:
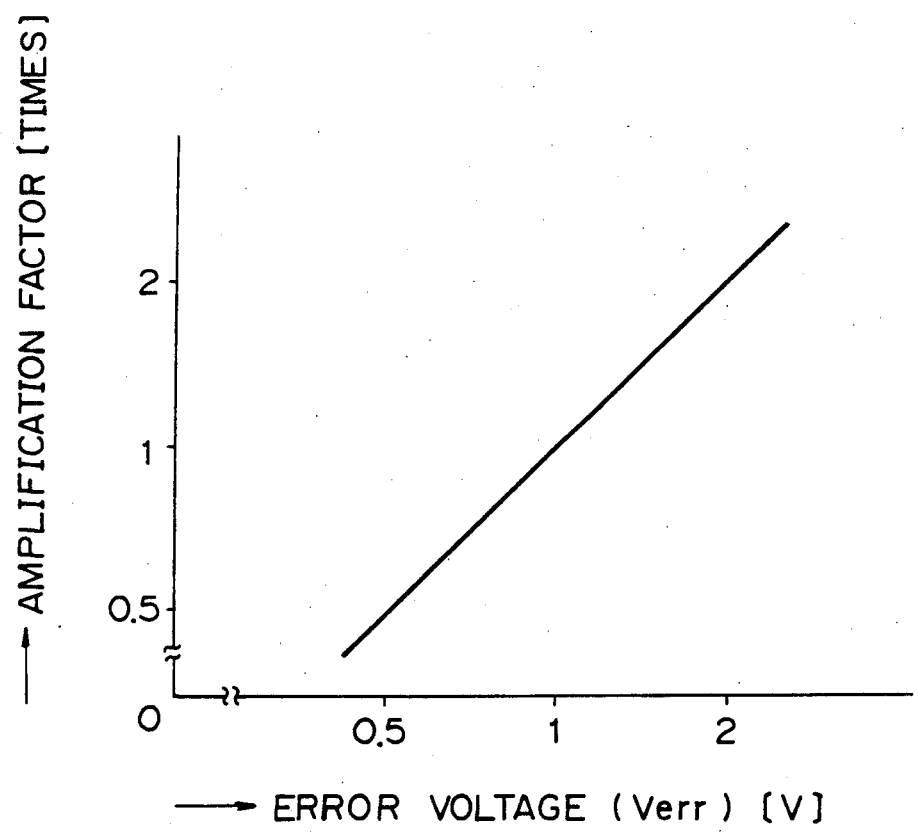
FIG. 5 plots a relationship between error voltages and amplification factors.

Assuming that A is "100 (times)" and the error voltage $V_{err}$ is $100 \cdot (1 - 0.99) = 1$ volt. The voltage $V_{err}$ and the amplification factor of the variable-gain amplifier 20 (1) are proportional to each other, as shown in FIG. 5. Hence, the error voltage of 1 volt is "1" in terms of amplification factor. Assume that the reference white signal $V_w$ is lowered to 0.98 volt, for example, due to a decrease in the quantity of light issuing from the lamp 14. Then, the gain control system operates in such a manner as to satisfy the above equation, so that the gain of the variable-gain amplifier 20 (1) is stabilized at approximately "1.01 (times)", i.e. $0.99/0.98 \approx 1.01$. That is, the error voltage $V_{err}$ is 1.01 volts. Calculating the reference white signal $V_w$ backward, $$0.01 = 100 \cdot (1 - V_w) \rightarrow = 1 - (0.01/100) \approx 0.99 \text{ (volt)}$$

Thus, the standard reference white signal $V_w$ is obtained.

This is true with the other CCD chips CCD2 to CCD4 also. Specifically, the above-stated gain control is effected with the outputs $V_{os2}$ to $V_{os4}$ by detecting the pilot signal $V_{pi0}$, preventing any change in the quantity of light from influencing the image signal. Further, even a change in the gain of the circuit associated with any of the CCD chips which is ascribable to a change in power source voltage or similar cause is absorbed.

In summary, it will be seen that the present invention provides a fragmentary sensor type image reader for an image forming apparatus which, with a single reference white plate, eliminates a level difference and therefore a density difference between individual sensor chips while absorbing the influence of a change in the quantity of light issuing from a light source or the like on an image signal, i.e. image quality.

Various modifications will become possible for those skilled in the art after receiving the teachings of the present disclosure without departing from the scope thereof.

What is claimed is:

1. An image reader for an image forming apparatus, comprising:
   fragmentary image reading means comprising a plurality of sensors which are arranged in an array along an image reading line;
   a reference white plate located in association with a particular position of and outside of an effective pixel reading range of one of two of the sensors which are situated at opposite ends of the image reading line, said one sensor producing a reference white signal by reading said reference white plate; and
   control means for controlling an output gain of said one sensor in dependence on the reference white signal.

2. An image reader as claimed in claim 1, wherein said sensors comprise CCD chips which are arranged in a zigzag configuration along the image reading line while overlapping each other.

3. An image reader as claimed in claim 1, further comprising:
   a variable gain amplifier connected to each of said sensors and receiving an output from an associated sensor;
   a sample and hold circuit connected to each of said variable gain amplifiers and receiving an output from an associated variable gain amplifier; and
   an error amplifier connected to each of said variable gain amplifiers and sample and hold circuits and receiving an output from an associated sample and hold circuit and outputting a signal to an associated variable gain amplifier, to thereby control the gain of the associated variable gain amplifier.

4. An image reader for an image forming apparatus, comprising:
   fragmentary image reading means comprising a plurality of sensors which are arranged in an array along an image reading line;
   a reference white plate located in association with a particular position of and outside of an effective pixel reading range of one of two of the sensors which are situated at opposite ends of the image reading line, said one sensor producing a reference white signal by reading said reference white plate; and
   control means for controlling an output gain of each of said sensors in dependence on the reference white signal.

5. An image reader as claimed in claim 4, wherein said sensors comprise CCD chips which are arranged in a zigzag configuration along the image reading line while overlapping each other.

6. An image reader as claimed in claim 4, further comprising:
   a variable gain amplifier connected to each of said sensors and receiving an output from an associated sensor;
   a sample and hold circuit connected to each of said variable gain amplifiers and receiving an output from an associated variable gain amplifier; and
   an error amplifier connected to each of said variable gain amplifiers and sample and hold circuits and receiving an output from an associated sample and hold circuit and outputting a signal to an associated variable gain amplifier, to thereby control the gain of the associated variable gain amplifier.

7. An image reader for an image forming apparatus, comprising:
   fragmentary image reading means comprising a plurality of sensors which are arranged in an array along an image reading line;
   a reference white plate located in association with a particular position of and outside of an effective pixel reading range of one of two of the sensors which are situated at opposite ends of the image reading line, said one sensor producing a reference white signal by reading said reference white plate; and
   control means for controlling an output gain of said sensor in dependence on the reference white signal and wherein said control means further controls output gains of the other sensors by adding a pilot signal to output signals of said other sensors.

8. An image reader as claimed in claim 7, wherein said sensors comprise CCD chips which are arranged in a zigzag configuration along the image reading line while overlapping each other.

9. An image reader as claimed in claim 7, further comprising:
   a variable gain amplifier connected to each of said sensors and receiving an output from an associated sensor;
   a sample and hold circuit connected to each of said variable gain amplifiers and receiving an output from an associated variable gain amplifier; and
   an error amplifier connected to each of said variable gain amplifiers and sample and hold circuits and receiving an output from an associated sample and hold circuit and outputting a signal to an associated variable gain amplifier, to thereby control the gain of the associated variable gain amplifier.

* * * * *